United States Patent
Chen et al.

(10) Patent No.: US 10,272,791 B2
(45) Date of Patent: Apr. 30, 2019

(54) METHOD OF INTELLIGENT POWER DISTRIBUTION FOR SYSTEM WITH DOUBLE CHARGING TERMINALS

(71) Applicant: PHIHONG TECHNOLOGY CO., LTD., Taoyuan (TW)

(72) Inventors: Chun-Chen Chen, Taoyuan (TW);
Jian-Hsieng Lee, Tainan (TW);
Ying-Chieh Yeh, Tainan (TW);
Hsiao-Tung Ku, Taoyuan (TW)

(73) Assignee: PHIHONG TECHNOLOGY CO., LTD., Taoyuan (TW)

( * ) Notice: Subject to any disclaimer, the term of this patent is extended or adjusted under 35 U.S.C. 154(b) by 190 days.

(21) Appl. No.: 15/284,540

(22) Filed: Oct. 4, 2016

(65) Prior Publication Data
US 2018/0050600 A1  Feb. 22, 2018

(30) Foreign Application Priority Data
Aug. 16, 2016  (TW) .............................. 105126143 A

(51) Int. Cl.
| | | |
|---|---|---|
| H02J 7/00 | (2006.01) | |
| H02J 7/14 | (2006.01) | |
| B60L 11/18 | (2006.01) | |

(52) U.S. Cl.
CPC ....... B60L 11/1838 (2013.01); B60L 11/1809 (2013.01); B60L 11/1824 (2013.01); B60L 11/1844 (2013.01); B60L 11/185 (2013.01); B60L 2230/00 (2013.01); B60L 2230/10 (2013.01); Y02E 60/721 (2013.01); Y02T 10/7005 (2013.01); Y02T 10/7088 (2013.01); Y02T 90/121 (2013.01); Y02T 90/128 (2013.01); Y02T 90/14 (2013.01); Y02T 90/163 (2013.01); Y04S 10/126 (2013.01)

(58) Field of Classification Search
USPC .......................... 320/104, 105, 109, 108, 107
See application file for complete search history.

(56) References Cited

U.S. PATENT DOCUMENTS

| | | | | |
|---|---|---|---|---|
| 8,760,125 | B2* | 6/2014 | Zhu ...................... | H02J 7/0013 |
| | | | | 320/119 |
| 8,981,718 | B2* | 3/2015 | Caffy .................. | B60L 11/1825 |
| | | | | 320/103 |
| 2011/0208953 | A1* | 8/2011 | Solomon .................... | G06F 1/14 |
| | | | | 713/2 |
| 2013/0057220 | A1* | 3/2013 | Whitacre ................ | H01M 2/20 |
| | | | | 320/128 |

(Continued)

*Primary Examiner* — Alexis B Pacheco
(74) *Attorney, Agent, or Firm* — Chih Feng Yeh; Huntington IP Consulting Co., Ltd.

(57) ABSTRACT

A method of intelligent power distribution for a charging system with double charging terminals is provided. The method of the present invention comprises the following steps, determining whether a first vehicle is requesting for charging or not. Then, the next step is determining whether a second vehicle is charging in the system or not. If the determination is affirmative, the first vehicle is then charged by remainder power modules. In the following, it is determining whether remainder power modules can be used for a second output terminal. Subsequently, it is determining whether the first vehicle needs more power by charging. If the determination is affirmative, the remainder power modules are charging to the first vehicle via the second output terminal.

20 Claims, 3 Drawing Sheets

(56) References Cited

U.S. PATENT DOCUMENTS

| | | | |
|---|---|---|---|
| 2014/0159646 A1* | 6/2014 | Sankar | H02J 17/00 320/107 |
| 2014/0184162 A1* | 7/2014 | Takahashi | H02J 7/007 320/128 |
| 2016/0059725 A1* | 3/2016 | Kim | H04B 5/0037 320/108 |
| 2016/0137082 A1* | 5/2016 | Jefferies | B60L 11/1818 320/109 |
| 2016/0288664 A1* | 10/2016 | Biagini | B60L 11/1816 |
| 2017/0063147 A1* | 3/2017 | Nakayama | H02J 3/32 |
| 2017/0225575 A1* | 8/2017 | Noro | B60L 11/1812 |

* cited by examiner

METHOD OF INTELLIGENT POWER DISTRIBUTION FOR SYSTEM WITH DOUBLE CHARGING TERMINALS

CROSS-REFERENCE TO RELATED APPLICATIONS

This application is a Counter Part Application of TAIWAN Patent Application Ser. No. 105126143, filed on Aug. 16, 2016. The content of the above-mentioned patent applications is hereby incorporated by reference herein in its entirety and made a part of this specification.

TECHNICAL FIELD

The present invention generally relates to a charging system of a vehicle, in particular, to a method of intelligent power distribution for system with double charging terminals.

DESCRIPTION OF RELATED ARTS

Traditionally, fuel vehicle mainly depends on petroleum, while shortage of oil and gas exhaust of fuel vehicle caused serious environment pollution, it would increasingly urgent for human being to further develop new green transportation. As a green transportation, electric vehicles not only save energy and improve comprehensive utilization of energy significantly, and environmental benefits are obvious, as compared with conventional vehicle, free of gas exhaust.

Now, vehicles using new energy is increasing on the market, especially electric vehicles are gradually replacing traditional power vehicles. However, because of the limitation of charging station, demand of charging position of electric vehicle for charging station is more diverse, it can't guarantee the consistency of charging position. If the vehicle uses a single charging interface mode, it will lead to a waste of charging resources in some portions.

In addition, the current charging equipment can only one-to-one charge to an electric vehicle, charging for a long time, so that the electric vehicle loads a larger capacity of battery to ensure that it can run enough mileage. Meanwhile in the evening, it has enough time to charge full power for electric vehicles, but the charging time of the electric vehicle is more than that of the traditional vehicle's fueling. It is not convenient for driver of the electric vehicle due to a waste of time.

For electric vehicle charging, communication of charging signal includes two kinds, one means of communication is sending the same frequency waveforms with different duty ratio during idle time of CP signal (i.e. charging power control confirmation signal), depending on identification data type of the duty ratio. Another means of communication is using carrier wave for data transmission as the electric vehicle is charging through a single charging gun.

However, for the communication of sending information during idle time of CP signal, it needs to wait for the idle time, and therefore it has some disadvantages such as, lower time utilization rate, poor instantaneity of data, easily interfering by power line as charging, without recognizing data, lower transmission success rate, and the reliability should be improved. For data transmission by carrier wave, charging time for high power electric vehicle charged by a single charging gun is too long, so it unfavorable for the actual operation.

The structure and control mode of the traditional charging system is more complex and lower efficiency; therefore, it is necessary to provide a method and a charging system with double guns which has simple structure and convenient to use, improve the existing technology, and further proposes an invention with industrial applicability.

SUMMARY

A method of intelligent power distribution for a charging system with double charging terminals can reach maximum efficiency of power use of the charging system.

A charging system with double charging terminals of the invention can optimize power distribution by efficiently distribute power modules of the charging system.

In the charging system with double charging terminals, if only single terminal is output power by charging or another terminal has idle power supply module, the invention can provide maximum output power (energy) for charging in accordance with the demand of vehicle(s).

According to an aspect of the invention, a method of power distribution for a charging system with double charging terminals comprises determining whether a request for charging is made from a first vehicle; determining whether a second vehicle is charging in the charging system; if the second vehicle is charging in the charging system, charging to the first vehicle by using remaining power modules; determining whether the remaining power modules can be supplied to a second output terminal; determining whether the first vehicle is charged to a pre-determined power; and if the first vehicle is not yet reaching to the pre-determined power, the remaining power modules are supplied to the second output terminal for charging to the first vehicle.

The above method further comprises communicating a first control module with a control module in the charging system and monitoring output power of all power modules in the charging system.

In the above method, if the second vehicle is not charged in the charging system, confirming whether maximum charging power required for the first vehicle exceeds maximum output power provided by the charging system. If the maximum charging power required for the first vehicle exceeds the maximum output power provided by the charging system, the charging system supplies (n−1) power modules to charge the first vehicle, wherein n is total number of all power modules of the charging system. If the maximum charging power required for the first vehicle does not exceed the maximum output power provided by the charging system, the charging system supplies less than (n−1) power modules for charging to the first vehicle.

According to an aspect of the invention, a method of power distribution for a charging system with double charging terminals comprises determining whether a first control module receives a charging command; determining whether a battery of a vehicle is charged to a pre-determined voltage; if the voltage of the battery of the vehicle does not reach to the pre-determined voltage, the first control module communicates with a second control module to learn serial numbers and amount of used power modules; determining amount of required power modules based-on present voltage of the battery of the vehicle; determining whether output power of the charging system meets a charging requirement of the vehicle; and if meets the charging requirement of the vehicle, continuously charging to the vehicle or release power of the remaining power modules.

According to another aspect of the invention, if can't meet said charging requirement of said vehicle, said first control module communicates with said second control module. Next, it further comprises determining whether the remaining power modules can be employed for charging. If the remaining power modules can be supplied for charging, sending a pre-charging voltage command for idle power modules to pre-charge to the present voltage of the battery of the vehicle. Then, it closing a control switch to output power of the idle power modules to the vehicle.

The components, characteristics and advantages of the present invention may be understood by the detailed descriptions of the preferred embodiments outlined in the specification and the drawings attached.

BRIEF DESCRIPTION OF THE DRAWINGS

The following diagrams are provided for detailed description and the embodiments of the invention such that the invention is fully understood; however, this can be only interpreted as a reference to understand the invention, rather than limit the invention in a particular embodiment.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

The present invention provides a method of energy distribution in a charging system with double charging terminals (gun A, gun B) for charging efficiently to achieve optimum power (energy) distribution of charging. Two central supervised units (CSU) are employed to monitor the state of output power of the charging system. When only a single gun (Gun A) is requested for charging, the internal output relays are regulated and controlled in accordance with charging current demand of the vehicle, to supply the maximum power for vehicle to be charged. As a vehicle is in a charging state, another vehicle also requests charging. The central supervised unit adjusts the output relay in accordance with the output state of the gun A, and remaining power modules of the gun A can supply to the gun B for charging.

Figure 1:
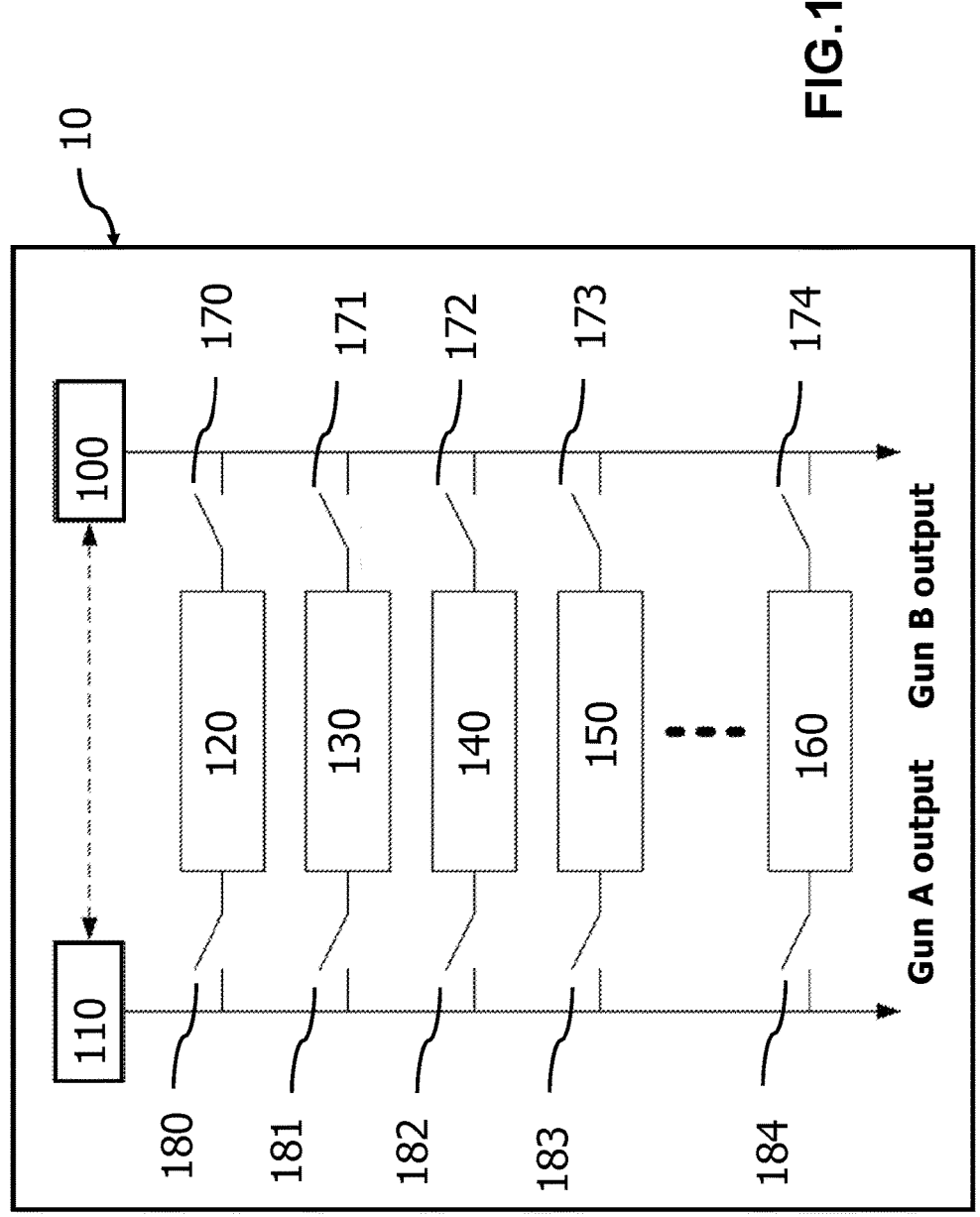
FIG. 1 shows a functional diagram of a charging system with double charging terminals according to an embodiment of the invention.

As shown in FIG. 1, it illustrates a functional diagram of a charging system 10 with double charging terminals according to an embodiment of the invention. The charging system includes two power output terminals (the first power output terminal, the second power output terminal), a first control module (central supervised unit) 100, a second control module (central supervised unit) 110, a plurality of power (supply) modules 120, 130, 140, 150 and 160, a plurality of first control switch 170, 171, 172, 173 and 174, a plurality of second control switches 180, 181, 182, 183 and 184. The first control module 100 and each of the first control switches 170, 171, 172, 173, and 174 are electrically connected, for example through a connecting wire, to the first power output terminal. The first control module is electrically connected to each of the first control switches 170, 171, 172, 173 and 174. The second control module 110 and a plurality of second control switches 180, 181, 182, 183 and 184 are electrically connected, for example through a connecting wire, to the second power output terminal. The second control module 110 is electrically connected to each of the second control switches 180, 181, 182, 183 and 184. Each of the power modules is electrically coupled to one of a plurality of first control switches of the first power output terminal, and coupled to one of a plurality of second control switches of the second power output terminal. In this embodiment, the power module 120 is electrically coupled to the first control switch 170 and the second control switch 180; the power module 130 electrically coupled to the first control switch 171 and the second control switch 181; the power module 140 electrically coupled to the first control switch 172 and the second control switch 182; the power module 150 electrically coupled to the first control switch 173 and the second control switch 183; the power module 160 electrically coupled to the first control switch 174 and the second control switch 184. In other words, electrical power is output by the power module 120 to the first power output terminal as the first control switch 170 is closed, and electrical power is output by the power module 120 to the second power output terminal as the second control switch 180 is closed. Electrical power is output by the power module 130 to the first power output terminal as the first control switch 171 is closed, and electrical power is output by the power module 130 to the second power output terminal as the second control switch 181 is closed. Electrical power is output by the power module 140 to the first power output terminal as the first control switch 172 is closed, and electrical power is output by the power module 140 to the second power output terminal as the second control switch 182 is closed. Electrical power is output by the power module 150 to the first power output terminal as the first control switch 173 is closed, and electrical power is output by the power module 150 to the second power output terminal as the second control switch 183 is closed. Electrical power is output by the power module 160 to the first power output terminal as the first control switch 174 is closed, and electrical power is output by the power module 160 to the second power output terminal as the second control switch 184 is closed. When the first control switch is in an open state (opened), the power module does not provide power to the first power output terminal. When the second control switch is in the open state, the power module does not supply power to the second power output terminal. Close or open of the first control switch 170, 171, 172, 173 and 174 is controlled by the first control module 100, and close or open of the second control switch 180, 181, 182, 183 and 184 is controlled by the second control module 110.

As shown in FIG. 1, it illustrates a functional diagram of a charging system with double charging terminals according to an embodiment of the invention. The charging system includes two power output terminals (the first power output terminal, the second power output terminal), a first control module (central supervised unit) 100, a second control module (central supervised unit) 110, a plurality of power (supply) modules 120, 130, 140, 150 and 160, a plurality of first control switch 170, 171, 172, 173 and 174, a plurality of second control switches 180, 181, 182, 183 and 184. The first control module 100 and each of the first control switches 170, 171, 172, 173, and 174 are electrically connected, for example through a connecting wire, to the first power output terminal. The first control module is electrically connected to each of the first control switches 170, 171, 172, 173 and 174. The second control module 110 and a plurality of second control switches 180, 181, 182, 183 and 184 are electrically connected, for example through a connecting wire, to the second power output terminal. The second control module 110 is electrically connected to each of the second control switches 180, 181, 182, 183 and 184. Each of the power modules is electrically coupled to one of a plurality of first control switches of the first power output terminal, and coupled to one of a plurality of second control switches of the second power output terminal. In this embodiment, the power module 120 is electrically coupled to the first control switch 170 and the second control switch 180; the power module 130 electrically coupled to the first control switch 171 and the second control switch 181; the power module 140 electrically coupled to the first control switch 172 and the second control switch 182; the power module 150 electrically coupled to the first control switch 173 and the second control switch 183; the power module 160 electrically coupled to the first control switch 174 and the second control switch 184. In other words, electrical power is output by the power module 120 to the first power output terminal as the first control switch 170 is closed, and electrical power is output by the power module 120 to the second power output terminal as the second control switch 180 is closed. Electrical power is output by the power module 130 to the first power output terminal as the first control switch 171 is closed, and electrical power is output by the power module 130 to the second power output terminal as the second control switch 181 is closed. Electrical power is output by the power module 140 to the first power output terminal as the first control switch 172 is closed, and electrical power is output by the power module 140 to the second power output terminal as the second control switch 182 is closed. Electrical power is output by the power module 150 to the first power output terminal as the first control switch 173 is closed, and electrical power is output by the power module 150 to the second power output terminal as the second control switch 183 is closed. Electrical power is output by the power module 160 to the first power output terminal as the first control switch 174 is closed, and electrical power is output by the power module 160 to the second power output terminal as the second control switch 184 is closed. When the first control switch is in an open state (opened), the power module does not provide power to the first power output terminal. When the second control switch is in the open state, the power module does not supply power to the second power output terminal. Close or open of the first control switch 170, 171, 172, 173 and 174 is controlled by the first control module 100, and close or open of the second control switch 180, 181, 182, 183 and 184 is controlled by the second control module 110.

The first control module 100 and the second control module 110 are a central supervised unit (CSU) to monitor output power (energy) of the charging system and communicate with the vehicle. The first control module 100 and the second control module 110 can wirelessly communicate with each other. For example, the first control module 100 has a first wireless module, and the second control module 110 has a second wireless module. The first wireless module and the second wireless module can wirelessly transmit and receive signals with each other. The first control switch, the second control switch contains a relay, a power metal oxide semiconductor transistor (power MOSFET), or other components with switch function. The relay is an electronic control element, which is used in the automatic control circuit. The relay is an automatic switch which can use a small current to control a larger current. Therefore, in the circuit, the relay can be used in automatic regulation, security protection, conversion circuit. For example, types of the relay include: voltage relay, current relay, time relay, temperature relay, speed relay, pressure relay, electromagnetic relay, induction relay, electrodynamic relay, electronic relay, thermal relay or light relay.

Figure 2:
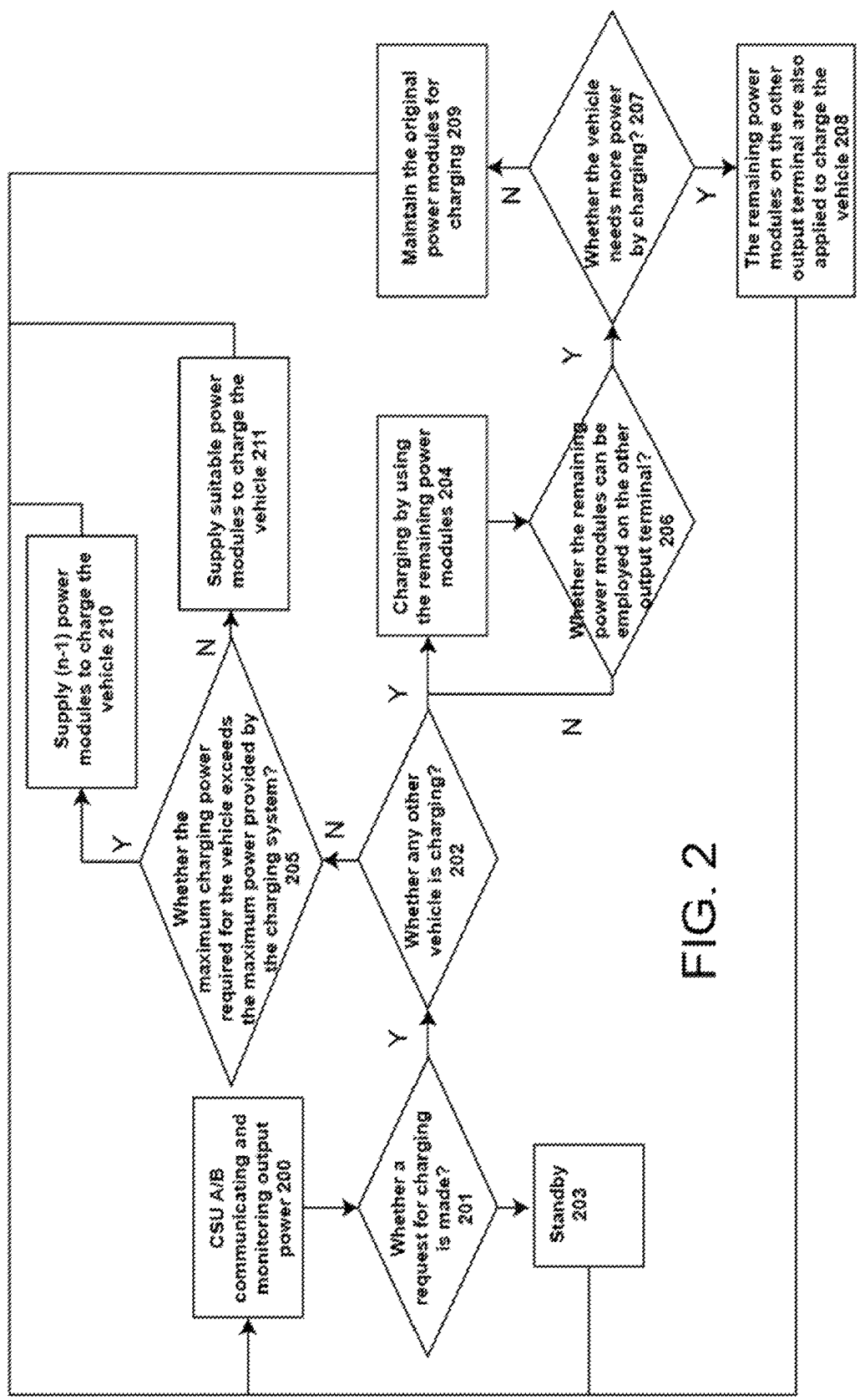
FIG. 2 shows a process flow of charging of a vehicle in a charging system with double charging terminals according to an embodiment of the invention.

As shown in FIG. 2, it illustrates a process flow of charging of a vehicle in a charging system with double charging terminals according to an embodiment of the invention. In the first step 200, the first control module 100 (CSU A) is communicating with the second control module 110 (CSU A) and monitoring output power of all power modules in the charging system. In the step 201, it confirms whether a user makes a request for charging. For example, a user of a vehicle makes a request for the vehicle to be charged. If there is no any request of charging, in the step 203, the charging system with double charging terminals is standby. If it has request of charging by the user, in the step 202, confirming whether any other vehicle is charging in the charging system. In this step, it is confirming whether any other vehicle is charged by the power module(s) via the power output terminal (the first power output terminal, the second power output terminal). If no any other vehicle is charged in the charging system, in the step 205, determining (confirming) whether the maximum charging power required for the vehicle exceeds the maximum output power provided by the charging system with double charging terminals. The maximum power refers to total power (energy) which all power modules of the charging with double charging terminals can supply. If the determination is affirmative (exceeds), in the step 210, the charging system supplies (n−1) power modules to charge the vehicle. If the determination is not affirmative (not exceeds), in the step 211, the charging system supplies suitable power modules (smaller than (n−1) power modules) to charge the vehicle, wherein "n" is the total number of all power modules of the charging system. Power of the power module is provided by closing its corresponding control switch.

If there is any other vehicle is charged, in the step 204, the remaining (unused) power modules are employed to charge to the vehicle (such as, charging to the first power output terminal). Subsequently, in the step 206, it confirms whether the remaining power modules can be employed on the other power output terminal (such as, the second power output terminal). When no remaining power modules can be employed on the other power output terminal (such as, the second power output terminal), back to the step 204, it still uses the remaining power modules on the current power output terminal (such as, the first power output terminal). When the other power output terminal (such as, the second power output terminal) has remaining power module(s) to be employed, in the step 207, it confirms whether the vehicle needs more power (energy) by charging. That is, it checks whether the vehicle is charged to a pre-determined power. When the vehicle does not need more power by charging, in the step 209, it maintains the original number power modules for charging to the vehicle. When the vehicle needs more power of charging (the vehicle is not yet reaching to the pre-determined power), in the step 208, the original power output terminal (such as, the first power output terminal) is charged to the vehicle, and the remaining power module(s) on the other output terminal (such as, the second power output terminal) is/are also applied to charge to the vehicle.

In one embodiment, the above-mentioned steps 200~211 may be performed by the first control module 100 and/or the second control module 110, or a central supervised unit.

Figure 3:
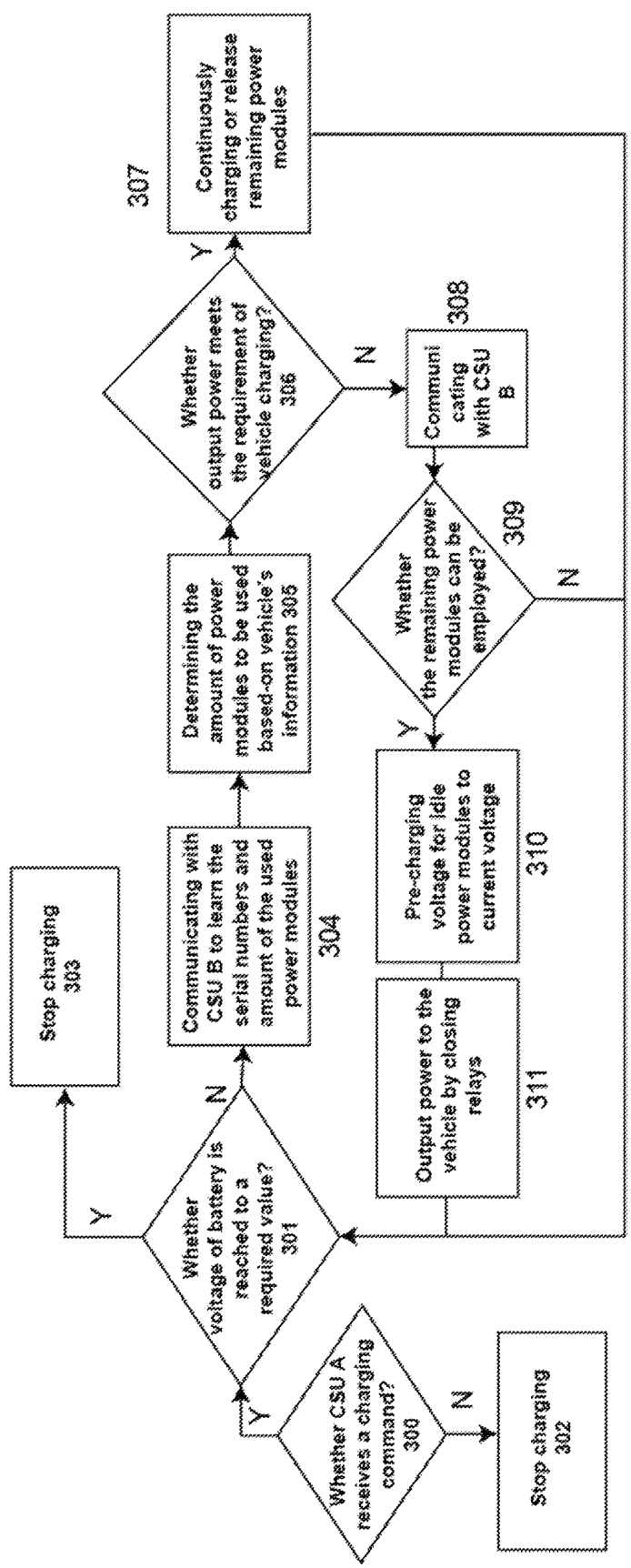
FIG. 3 shows a process flow of charging of a vehicle in a charging system with double charging terminals according to an embodiment of the invention.

As shown in FIG. 3, it illustrates a process flow of charging of a vehicle in a charging system with double charging terminals according to an embodiment of the invention. In the step 300, it confirms whether the first control module (CSU A) receives a charging command. If without receiving the charging command, in the step 302, the charging system stops charging. If receiving the charging command, in the step 301, it confirms (determines) whether voltage of a battery is reached to a required value. For example, it confirms (determines) whether present voltage of the battery of a pre-charged vehicle is reached to a pre-set (pre-determined) voltage. If the present voltage of the battery of the vehicle is reached to the pre-set (pre-determined) voltage, in the step 303, the charging system stops charging. If the present voltage of the battery of the vehicle does not reach to the pre-set (pre-determined) voltage, in the step 304, the first control module (CSU A) communicates with the second control module (CSU B) to learn (obtain) the serial numbers and amount of the used power modules. For example, the power modules 120, 130, 140, 150 and 160 of FIG. 1 can be numbered. After the serial numbers and amount of the used power modules are obtained, followed by the step 305, it determining the amount of required power modules based-on the vehicle's information. In one embodiment, the vehicle's information relates to the present voltage of the battery of the pre-charged vehicle to calculate or determine the amount of required power modules for charging and required time of charging. After the amount of the required power modules for charging is determined, in the step 306, it determines whether output power of the charging system with double charging terminals meets the charging requirement of the vehicle. If it can meet the charging requirement of the vehicle, in the step 307, continuously charging to the vehicle or release power of the remaining power modules. The power of the remaining power modules is released (output) by closing the corresponding control switches. As the voltage of the battery is reached to the pre-set (pre-determined) voltage in the step 301, the charging is stopped in the step 303.

Alternatively, if it can't meet the charging requirement of the vehicle in the step 306, the first control module (CSU A) communicates with the second control module (CSU B). Based-on the first control module (CSU A) and the second control module (CSU B), it can learn (obtain) the serial numbers and amount of the power modules supplied for charging. Therefore, in the following step 309, it determines whether the remaining power modules can be employed for charging. If the remaining power modules can be supplied for charging, in the step 310, sending a pre-charging voltage command for idle power modules to pre-charge to the present (current) voltage of the battery of the pre-charged vehicle. Then, in the step 311, power of the idle power modules is output to the vehicle by closing control switches (relays). As the voltage of the battery is reached to the pre-set (pre-determined) voltage in the step 301, the charging system stops charging in the step 303.

In one embodiment, the above-mentioned steps 300~311 may be performed (determined or decided) by the first control module 100 and/or the second control module 110, or a central supervised unit.

It will be understood that the above descriptions of embodiments are given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention.

What is claimed is:

1. A method of power distribution for a charging system with double charging terminals, comprising:

providing a charging system with double charging terminals, wherein said charging system includes a first output terminal and a second output terminal, a first central supervised unit and a second central supervised unit, a plurality of first control switches and a plurality of second control switches, and a plurality of power modules connected in parallel, wherein said first central supervised unit and each of said plurality of first control switches is electrically connected to said first output terminal, and said second central supervised unit and each of said plurality of second control switches is electrically connected to said second output terminal, wherein each of said plurality of power modules is electrically connected to said first output terminal via a corresponding said first control switch and electrically connected to said second output terminal via a corresponding said second control switch;

utilizing said first central supervised unit for determining whether a request for charging is made from a first vehicle;

utilizing said second central supervised unit for determining whether a second vehicle is charging in said second output terminal of said charging system, based-on said second central supervised unit to control said corresponding second control switch for closing or opening, and each of said plurality of power modules is electrically connected to said second output terminal via said corresponding second control switch;

if said second vehicle is charging in said second output terminal of said charging system, capable of charging to said first vehicle by using remaining power modules of said plurality of power modules;

utilizing said second central supervised unit for determining whether said remaining power modules can be supplied to said second output terminal;

utilizing said first central supervised unit for determining whether said first vehicle is charged to a pre-determined power; and if said first vehicle is not yet reaching to said pre-determined power, said remaining power modules are supplied to said first output terminal for charging to said first vehicle, based-on said first central supervised unit to control said corresponding first control switch for closing, and each of said plurality of power modules is electrically connected to said first output terminal via said corresponding first control switch.

2. The method as set forth in claim 1, further comprising communicating said first central supervised unit with said second central supervised unit and monitoring output power of all power modules in said charging system.

3. The method as set forth in claim 1, if said second vehicle is not charged in said charging system, confirming whether maximum charging power required for said first vehicle exceeds maximum output power provided by said charging system.

4. The method as set forth in claim 3, if said maximum charging power required for said first vehicle exceeds said maximum output power provided by said charging system, said charging system supplies (n−1) power modules to charge said first vehicle, wherein said n is total number of all power modules of said charging system.

5. The method as set forth in claim 4, if said maximum charging power required for said first vehicle does not exceed said maximum output power provided by said charging system, said charging system supplies less than (n−1) power modules for charging to said first vehicle.

6. The method as set forth in claim 1, wherein one of said remaining power modules is used to charge said first vehicle by closing a control switch of said plurality of first control switches.

7. The method as set forth in claim 6, wherein said control switch is a relay.

8. The method as set forth in claim 7, wherein said relay is a voltage relay, current relay, electromagnetic relay, induction relay, electrodynamic relay or electronic relay.

9. The method as set forth in claim 7, wherein said relay is a time relay, temperature relay, speed relay, pressure relay, thermal relay or light relay.

10. The method as set forth in claim 6, wherein said control switch is a power MOSFET.

11. A method of power distribution for a charging system with double charging terminals, comprising:
   providing a charging system with double charging terminals, wherein said charging system includes a first output terminal and a second output terminal, a first central supervised unit and a second central supervised unit, a plurality of first control switches and a plurality of second control switches, and a plurality of power modules, wherein said first central supervised unit and each of said plurality of first control switches is electrically connected to said first output terminal, and said second central supervised unit and each of said plurality of second control switches is electrically connected to said second output terminal, wherein each of said plurality of power modules is electrically connected to said first output terminal via a corresponding said first control switch and electrically connected to said second output terminal via a corresponding said second control switch;
   determining whether said first central supervised unit receives a charging command;
   determining whether a battery of a vehicle is charged to a pre-determined voltage;
   if said voltage of said battery of said vehicle does not reach to said pre-determined voltage, said first central supervised unit communicates with said second central supervised unit to learn serial numbers and amount of used power modules of said plurality of power modules, based-on said first central supervised unit to control said corresponding first control switch for closing or opening, and each of said plurality of power modules is electrically connected to said first output terminal via said corresponding first control switch, based-on said second central supervised unit to control said corresponding second control switch for closing or opening, and each of said plurality of power modules is electrically connected to said second output terminal via said corresponding second control switch;
   determining amount of required power modules based-on present voltage of said battery of said vehicle;
   determining whether output power of said charging system meets a charging requirement of said vehicle; and
   if meets said charging requirement of said vehicle, continuously charging to said vehicle or release power of remaining power modules of said plurality of power modules.

12. The method as set forth in claim 11, if can't meet said charging requirement of said vehicle, said first central supervised unit communicates with said second central supervised unit.

13. The method as set forth in claim 12, further comprising determining whether said remaining power modules can be employed for charging.

14. The method as set forth in claim 13, if said remaining power modules can be supplied for charging, sending a pre-charging voltage command for idle power modules to pre-charge to said present voltage of said battery of said vehicle.

15. The method as set forth in claim 14, further comprising closing a control switch of said plurality of first control switches or said plurality of second control switches to output power of said idle power modules to said vehicle.

16. The method as set forth in claim 15, as said voltage of said battery is reached to said pre-determined voltage, said charging system stops charging.

17. The method as set forth in claim 15, wherein said control switch is a relay.

18. The method as set forth in claim 17, wherein said relay is a voltage relay, current relay, electromagnetic relay, induction relay, electrodynamic relay or electronic relay.

19. The method as set forth in claim 17, wherein said relay is a time relay, temperature relay, speed relay, pressure relay, thermal relay or light relay.

20. The method as set forth in claim 15, wherein said control switch is a power MOSFET.

* * * * *